US008494856B2

(12) United States Patent
Latorre et al.

(10) Patent No.: US 8,494,856 B2
(45) Date of Patent: Jul. 23, 2013

(54) SPEECH SYNTHESIZER, SPEECH SYNTHESIZING METHOD AND PROGRAM PRODUCT

(75) Inventors: Javier Latorre, Tokyo (JP); Masami Akamine, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/271,321

(22) Filed: Oct. 12, 2011

(65) Prior Publication Data

US 2012/0089402 A1 Apr. 12, 2012

Related U.S. Application Data

(63) Continuation of application No. PCT/JP2009/057615, filed on Apr. 15, 2009.

(51) Int. Cl.

| | |
|---|---|
| ***G10L 13/08*** | (2006.01) |
| *G10L 13/00* | (2006.01) |
| *G10L 13/06* | (2006.01) |
| *G10L 15/06* | (2006.01) |
| *G10L 17/00* | (2006.01) |
| *G09G 5/22* | (2006.01) |
| *G06F 17/28* | (2006.01) |

(52) U.S. Cl.

USPC ............... 704/260; 704/3; 704/244; 704/250; 704/264; 704/268; 345/440.1

(58) Field of Classification Search

USPC .... 704/260, 3, 244, 250, 264, 268; 345/440.1

See application file for complete search history.

(56) References Cited

U.S. PATENT DOCUMENTS

| | | | | |
|---|---|---|---|---|
| 6,961,704 | B1 * | 11/2005 | Phillips et al. | 704/268 |
| 7,996,222 | B2 * | 8/2011 | Nurminen et al. | 704/250 |
| 8,015,011 | B2 * | 9/2011 | Nagano et al. | 704/260 |
| 8,219,398 | B2 * | 7/2012 | Marple et al. | 704/260 |
| 2003/0097266 | A1 * | 5/2003 | Acero | 704/260 |
| 2006/0136213 | A1 | 6/2006 | Hirose et al. | |
| 2009/0070115 | A1 * | 3/2009 | Tachibana et al. | 704/260 |
| 2009/0083036 | A1 * | 3/2009 | Zhao et al. | 704/260 |
| 2009/0157409 | A1 * | 6/2009 | Lifu et al. | 704/260 |

(Continued)

OTHER PUBLICATIONS

International Search Report for International Application No. PCT/JP2009/057615 mailed on Jul. 7, 2009.

*Primary Examiner* — Pierre-Louis Desir
*Assistant Examiner* — Neeraj Sharma
(74) *Attorney, Agent, or Firm* — Turocy & Watson, LLP

(57) ABSTRACT

According to one embodiment, a speech synthesizer includes an analyzer, a first estimator, a selector, a generator, a second estimator, and a synthesizer. The analyzer analyzes text and extracts a linguistic feature. The first estimator selects a first prosody model adapted to the linguistic feature and estimates prosody information that maximizes a first likelihood representing probability of the selected first prosody model. The selector selects speech units that minimize a cost function determined in accordance with the prosody information. The generator generates a second prosody model that is a model of the prosody information of the speech units. The second estimator estimates prosody information that maximizes a third likelihood calculated on the basis of the first likelihood and a second likelihood representing probability of the second prosody model. The synthesizer generates synthetic speech by concatenating the speech units on the basis of the prosody information estimated by the second estimator.

5 Claims, 3 Drawing Sheets

U.S. PATENT DOCUMENTS

| | | | | |
|---|---|---|---|---|
| 2009/0299747 | A1* | 12/2009 | Raitio et al. | 704/264 |
| 2010/0004931 | A1* | 1/2010 | Ma et al. | 704/244 |
| 2010/0042410 | A1* | 2/2010 | Stephens, Jr. | 704/260 |
| 2010/0057435 | A1* | 3/2010 | Kent et al. | 704/3 |
| 2010/0066742 | A1* | 3/2010 | Qian et al. | 345/440.1 |
| 2010/0312562 | A1* | 12/2010 | Wang et al. | 704/260 |

* cited by examiner

SPEECH SYNTHESIZER, SPEECH SYNTHESIZING METHOD AND PROGRAM PRODUCT

CROSS-REFERENCE TO RELATED APPLICATIONS

This application is a continuation of PCT international application Ser. No. PCT/JP2009/057615, filed on Apr. 15, 2009, and which designates the United States; the entire contents of which are incorporated herein by reference.

FIELD

Embodiments described herein relate generally to a speech synthesizer, a speech synthesizing method and a program product.

BACKGROUND

A speech synthesizer that generates speech from, text includes three main processors, i.e., a text analyzer, a prosody generator, and a speech signal generator. The text analyzer performs a text analysis of input text (a sentence including Chinese characters and kana characters) using, for example, a language dictionary and outputs linguistic information (also referred to as linguistic features) such as phoneme strings, morphemes, readings of Chinese characters, positions of stresses, and boundaries of segments (stressed phrases). On the basis of the linguistic features, the prosody generator outputs prosody information including a time variation pattern (hereinafter referred to as a pitch envelope) of the pitch of the speech (basic frequency) and the length (hereinafter referred to as the duration) of each phoneme. The prosody generator is an important device that contributes to the quality and the overall naturalness of synthetic speech.

A technique is proposed in U.S. Pat. No. 6,405,169 in which a generated prosody is compared with the prosody of speech units used in a speech signal generator, and the prosody of speech units is used when the difference therebetween is small in order to reduce distortion of synthetic speech. A technique is proposed in "Multilevel parametric-base F0 model for speech synthesis" Proc. Interspeech 2008, Brisbane, Australia, pp. 2274-2277 (Latorre, J., Akamine, M.) in which pitch envelopes are modeled for phonemes, syllables, and the like and a pitch envelope pattern is generated from the plural pitch envelope models to thereby generate a natural pitch envelope that varies smoothly.

On the basis of the linguistic features from the text analyzer and the prosody information from the prosody generator, the speech signal generator generates a speech waveform. Currently, a method called a concatenative synthesis method is generally used, which can synthesize relatively high quality speech.

The concatenative synthesis method includes selecting speech units on the basis of linguistic features determined by the text analyzer and the prosody information generated by the prosody generator, modifying the pitches (basic frequencies) and the durations of the speech units on the basis of the prosody information, concatenating the speech units, and outputting synthetic speech. The speech quality is significantly reduced by the modification of the pitches and the durations of the speech units.

A method is known for coping with this problem in which a large-scale speech unit database is provided and speech units are selected from a large number of speech unit candidates with various pitches and durations. By using this method, modifications to pitch and duration can be minimized, the reduction in the speech quality due to the modifications can be suppressed, and speech synthesis with high quality can be achieved. However, this method requires an extremely large database for storing speech units.

There is also a method in which the pitches and the durations of selected speech units are used without modifying the pitches and the durations of the speech units. This method can avoid any reduction in the speech quality due to modifications to pitch and duration. However, the continuity of pitches of the selected and concatenated speech units is not necessarily guaranteed, and discontinuous pitches degrade the naturalness of synthetic speech. To improve the naturalness of the pitches and the durations of the speech units, the number of types of speech units needs to be increased, and this requires an extremely large database for storing the speech units.

DETAILED DESCRIPTION

In general, according to one embodiment, a speech synthesizer includes an analyzer, a first estimator, a selector, a generator, a second estimator, and a synthesizer. The analyzer analyzes text and extracts a linguistic feature. The first estimator selects a first prosody model adapted to the extracted linguistic feature and estimates prosody information that maximizes a first likelihood representing probability of the selected first prosody model. The selector selects speech units that minimize the cost function determined in accordance with the prosody information. The generator generates a second prosody model that is a model of prosody information of the selected speech units. The second estimator estimates prosody information that maximizes a third likelihood calculated on the basis of the first likelihood and a second likelihood representing probability of the second prosody model. The synthesizer generates synthetic speech by concatenating the selected speech units on the basis of the prosody information estimated by the second estimator.

Exemplary embodiments of a speech synthesizer will be described below in detail with reference to the accompanying drawings.

A speech synthesizer according to an embodiment estimates prosody information that maximizes a likelihood (first likelihood) representing probability of a statistical model (first prosody model) of prosody information, and creates a statistical model (second prosody model) representing a probability density of prosody information of speech units, which are selected on the basis of the estimated prosody information. The speech synthesizer then estimates prosody information that maximizes a likelihood (third likelihood) of a prosody model taking a likelihood (second likelihood) representing the probability of the created second prosody model into consideration.

Because prosody information closer to the prosody information of the selected speech units can be used, modifications of the prosody information of the selected speech units can be minimized. Thus, degradation of the speech quality can be reduced in a concatenative synthesis method.

Figure 1:
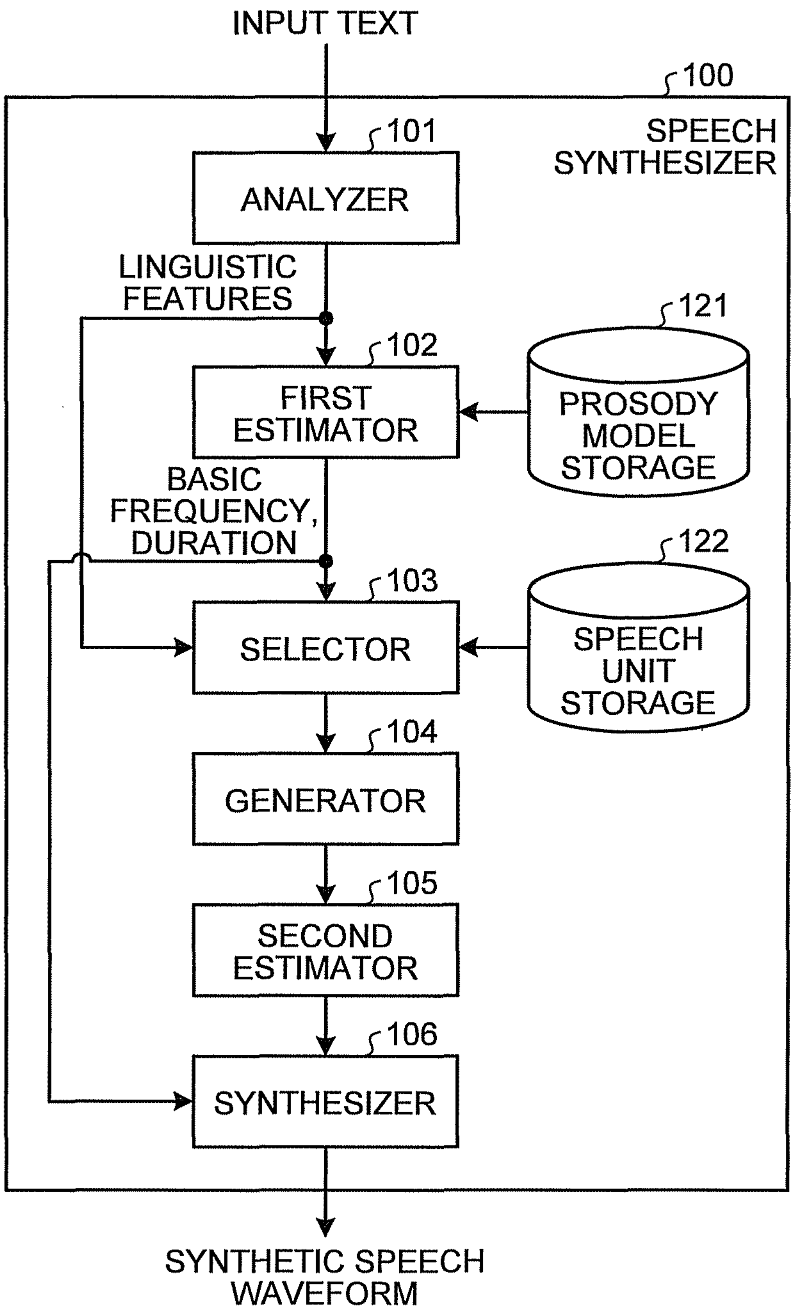
FIG. 1 is a block diagram illustrating an example of a configuration of a speech synthesizer according to an embodiment.

FIG. 1 is a block diagram illustrating an example of a configuration of a speech synthesizer 100 according to the embodiment. As illustrated in FIG. 1, the speech synthesizer 100 includes a prosody model storage 121, a speech unit storage 122, an analyzer 101, a first estimator 102, a selector 103, a generator 104, a second estimator 105 and a synthesizer 106.

The prosody model storage 121 stores in advance a prosody model (first prosody model) that is a statistical model of prosody information created through training or the like. For example, the prosody model storage 121 may be configured to store a prosody model created by the method disclosed in "Multilevel parametric-base F0 model for speech synthesis".

The speech unit storage 122 stores a plurality of speech units that are created in advance. The speech unit storage 122 stores speech units in units (synthesis units) used in the generation of synthetic speech. Examples of the synthesis units, i.e., units of speech, include various units such as half-phones, phones, and diphones. A case where half-phones are used will be described in the embodiment.

The speech unit storage 122 stores prosody information (basic frequency, duration) for each of the speech units that is referred to when the generator 104 (described later) generates a prosody model of prosody information of the speech units.

The analyzer 101 analyzes an input document (hereinafter referred to as an input text), and extracts linguistic features to be used for prosody control therefrom. The analyzer 101 analyzes the input text by using a word dictionary (not illustrated), for example, and extracts linguistic features of the input text. Examples of the linguistic features include phoneme information of the input text, information on phonemes before and after each phoneme, positions of stresses, and boundaries of stressed phrases.

The first estimator 102 selects a prosody model in the prosody model storage 121, which is adapted to the extracted linguistic features, and estimates prosody information of each phoneme in the input text on the basis of the selected prosody model. Specifically, the first estimator 102 uses linguistic features such as information on phonemes before and after a phoneme and a position of stress for each phoneme in the input text to select a prosody model corresponding to the linguistic features from the prosody model storage 121, and the first estimator 102 estimates prosody information including the duration and the basic frequency of each phoneme by using the selected prosody model.

The first estimator 102 selects an appropriate prosody model using a decision tree that is trained in advance. The linguistic features of the input text are subjected to questioning at each node, each node is further branched as needed, and a prosody model stored in a reached leaf is extracted. The decision tree can be trained using a generally known method.

The first estimator 102 also defines a log-likelihood function of the duration and a log-likelihood function of the basic frequency on the basis of a sequence of prosody models selected for the input text, and the first estimator 102 determines the duration and the basic frequency that maximize the log-likelihood functions. The thus obtained duration and basic frequency are an initial estimate of the prosody information. Note that the log-likelihood function used for initial estimation of the prosody information by the first estimator 102 is expressed as $F^{initial}$.

The first estimator 102 can estimate the prosody information using the method disclosed in "Multilevel parametric-base F0 model for speech synthesis", for example. In this case, a parameter of the basic frequency to be obtained is an Nth order DCT coefficient (N is a natural number; N=5, for example). The pitch envelope of each syllable can be obtained by inverse-DCT of the DCT coefficient.

The linguistic features output from the analyzer 101 and the basic frequency and the duration estimated by the first estimator 102 are supplied to the selector 103.

The selector 103 selects, from the speech unit storage 122, a plurality of candidates of a speech unit string (candidate speech unit strings) that minimizes the cost function. The selector 103 selects a plurality of candidate speech unit strings using a method disclosed in Japanese Patent No. 4080989.

The cost function includes a speech unit target cost and a speech unit concatenation cost. The speech unit target cost is calculated as a function of the distance between the linguistic features, the basic frequencies and the durations supplied to the selector 103 and the linguistic features, the basic frequencies, and the durations of speech units stored in the speech unit storage 122. The speech unit concatenation cost is calculated as a sum of the distances between spectral parameters of two speech units at concatenation points of speech units of the entire input text.

The basic frequency and the duration of each speech unit included in the selected candidate speech unit strings are supplied to the generator 104.

The generator 104 generates a prosody model (second prosody model), which is a statistical model of prosody information of a speech unit, for each speech unit included in the selected candidate speech unit strings. For example, the generator 104 creates a statistical model expressing a probability density of samples of the basic frequency of speech units and a statistical model expressing a probability density of samples of the duration of the speech units as the prosody models of the speech units.

Gaussian mixture models (GMM), for example, can be used as the statistical models. In this case, parameters of the statistical models are an average vector and a covariance matrix of gaussian components. The generator 104 obtains a plurality of corresponding speech units from the candidate speech unit strings and calculates parameters of GMM by using the basic frequencies and the durations of the speech units.

Note that the number of samples of the durations of speech units stored in the speech unit storage 122, namely the basic frequencies constituting the pitch envelope of the speech units varies for each speech unit. Accordingly, the generator 104 creates a statistical model for each sample of the basic frequency at a beginning point, a middle point and an end point of the speech units, for example, in creating the statistical model of the basic frequency.

Although the case of directly modeling samples of the basic frequency or the like has been described above, the generator 104 may be configured to use the method disclosed in "Multilevel parametric-base F0 model for speech synthesis" that models a pitch envelope. In this case, the pitch envelope is expressed by fifth-order DCT coefficients, for example, and a probability density function of each coefficient is modeled as a GMM. Furthermore, the pitch envelope can also be expressed by a polynomial. In this case, coefficients of the polynomial are modeled as a GMM. The durations of the speech units are modeled as a GMM without any change.

The second estimator 105 estimates prosody information of each speech unit in the input text by using the prosody model for each speech unit in the input text generated by the generator 104. First, the second estimator 105 calculates a total log-likelihood function $F^{total}$ that is a linear coupling of a log-likelihood function $F^{feedback}$ calculated from the statistical models generated by the generator 104 and the log-likelihood function $F^{initial}$ used for the initial estimation of the prosody information for each of the basic frequency and the duration.

The second estimator 105 calculates the total log-likelihood function $F^{total}$ with the following equation (1), for example. Note that $\lambda^{feedback}$ and $\lambda^{initial}$ represent predetermined coefficients.

$$F^{total}=\lambda^{feedback}F^{feedback}+\lambda^{initial}F^{initial} \quad (1)$$

The second estimator 105 may alternatively be configured to calculate the total log-likelihood function $F^{total}$ with the following equation (2). Note that λ represents a predetermined weighting factor.

$$F^{total}=\lambda F^{feedback}+(1-\lambda)F^{initial} \quad (2)$$

The second estimator 105 then re-estimates each of the basic frequency and the duration that maximize $F^{total}$ by differentiating $F^{total}$ with respect to a parameter (basic frequency or duration) $x^{syllable}$ of the prosody model, as shown in the following equation (3).

$$\frac{\partial F^{total}}{\partial x^{syllable}} = \lambda^{feedback}\frac{\partial F^{feedback}}{\partial x^{syllable}} + \lambda^{initial}\frac{\partial F^{initial}}{\partial x^{syllable}} \quad (3)$$

In order to re-estimate the prosody information by using the equation (3), it is necessary that the log-likelihood function $F^{feedback}$ can be added (linearly coupled) to the log-likelihood function $F^{initial}$ of the prosody model in the prosody model storage 121 and is differentiable with respect to the parameter $x^{syllable}$ of the prosody model.

When the first estimator 102 initially estimates the prosody information by the method in "Multilevel parametric-base F0 model for speech synthesis", re-estimation of the prosody information using the equation (3) is possible by defining the log-likelihood function $F^{feedback}$ as follows.

If a single GMM is assumed, a general form of the log-likelihood function $F^{feedback}$ of half phones hp belonging to the same syllable s is expressed by the following equation (4).

$$F^{feedback} = \frac{-1}{2}\sum_{\forall s}\sum_{\forall hp\in s}(o_{hp}-\mu_{hp})^T\Sigma_{hp}^{-1}(o_{hp}-\mu_{hp}) + Const \quad (4)$$

Const represents a constant, and $O_{hp}$, $\mu_{hp}$ and $\Sigma_{hp}$ represent a parameterized vector, an average and a covariance of the pitch envelope of the half-phones, respectively. A simple method for defining $O_{hp}$ is to use linear transformation of the pitch envelope expressed by the following equation (5).

$$o_{hp}=H_{hp}\log F0_{hp}=H_{hp}S_{hp}\log F0_s \quad (5)$$

$\log F0_{hp}$ represents the pitch envelope of the half-phones hp, $H_{hp}$ represents a transformation matrix, $\text{Log } F0_s$ represents the pitch envelope of a syllable to which the half-phones belong, and $S_{hp}$ represents a matrix for selecting $\log F0_{hp}$ from $\log F0_s$.

$x^{syllable}$ is expressed by the following equation (6), for example. $x_s$ in the equation (6) is a vector composed of the first five coefficients of DCT of $\log F0_s$ and is expressed by the following equation (7).

$$x^{syllable}=[x^T_1,x^T_2, \ldots , x^T_s, \ldots , x^T_s]^T \quad (6)$$

$$x_s=T_s\cdot\log F0_s \quad (7)$$

Since $T_s$ is an invertible linear transformation, the following equation (8) can be obtained. Accordingly, $F^{feedback}$ is expressed by the following equation (9).

$$o_{hp} = H_{hp}S_{hp}T_s^{-1}x_s = M_{hp}\cdot x_s \quad (8)$$

$$F^{feedback} = \frac{-1}{2}\sum_{\forall s}\sum_{\forall hp\in s}(M_{hp}\cdot x_s-\mu_{hp})^T\Sigma_{hp}^{-1}(M_{hp}\cdot x_s-\mu_{hp}) + Const \quad (9)$$

Consequently, the first term on the right side of the equation (3) can be expressed by the following equation (10). $A_s$ and $B_s$ in the equation (10) are expressed by the following equation (11) and equation (12), respectively.

$$\frac{\partial F^{feedback}}{\partial x^{syllable}} = \sum_{\forall s}A_s x_s + B_s \quad (10)$$

$$A_s = \sum_{hp\in s}M_{hp}^T\Sigma_{hp}M_{hp} \quad (11)$$

$$B_s = \sum_{hp\in s}M_{hp}^T\Sigma_{hp}\mu_{hp} \quad (12)$$

As expressed by the equation (3) and the equation (4), the definition of the transformation matrix H also determines the values of $\mu_{hp}$ and $\Sigma_{hp}$. These values are calculated by the following equation (13) and equation (14) from a set of U samples selected for the half-phones hp.

$$\mu_{hp} = \frac{1}{U}\sum_{u=1}^{U}H_u\cdot\log F0_u \quad (13)$$

$$\Sigma_{hp} = \frac{1}{U}\sum_{u=1}^{U}(H_u\cdot\log F0_u)(H_u\cdot\log F0_u)^T - \mu_{hp}\cdot\mu_{hp}^T \quad (14)$$

In general, the values of the transformation matrix H depend only on the samples and the durations of the half-phones. The transformation matrix H can be defined in units of samples or in units of parameters.

In the case of the units of samples, the transformation matrix H is defined by using sample points at predetermined positions from $\log F0_u$. For example, if pitches at a beginning point, a middle point and an end point are to be obtained, the transformation matrix $H_u$ is a matrix of dimensions $3\times L_u$. $L_u$ is the length of $\log F0_u$, which is 1 at positions (1, 1), (2, $L_u/2$) and ($L_u$, $L_u$) or 0 at other positions.

In the case of the units of parameters, the transformation matrix is defined as a transformation of the pitch envelope. A simple method is to determine H as a transformation matrix for obtaining an average of the pitch envelope at a beginning point, a middle point and an end point of phones. In this case, the transformation matrix H is expressed by the following equation (15). D1, D2, . . . D3 represent the durations of segments at the beginning point, the middle point and the end point of $\log F0_u$, respectively. Note that the transformation matrix H can also be defined as a DCT matrix.

$$H_u = \begin{pmatrix} \frac{1}{D_1} & 0 & 0 \\ 0 & \frac{1}{D_2} & 0 \\ 0 & 0 & \frac{1}{D3} \end{pmatrix} \cdot \begin{pmatrix} \overbrace{1 \ldots 1}^{D_1} & \overbrace{0 \ldots \ldots}^{D_2} & \overbrace{\ldots \ldots 0}^{D_3} \\ 0 \ldots 0 & 1 \ldots 1 & 0 \ldots 0 \\ 0 \ldots \ldots & \ldots \ldots \ldots & 1 \ldots 1 \end{pmatrix} \tag{15}$$

Although a case where the prosody information is estimated by the method in "Multilevel parametric-base F0 model for speech synthesis" has been described above, the applicable method is not limited to the method in "Multilevel parametric-base F0 model for speech synthesis". Any method can be applied as long as a new likelihood (third likelihood) can be the likelihood of the prosody model of speech units generated by the generator 104 and the likelihood of the prosody model in the prosody model storage 121 and the prosody information can be re-estimated by the calculated likelihood.

The synthesizer 106 modifies the durations and the basic frequencies of the speech units on the basis of the prosody information estimated by the second estimator 105, concatenates the speech units resulting from the modification to create a waveform of synthetic speech, and outputs the waveform.

Figure 2:
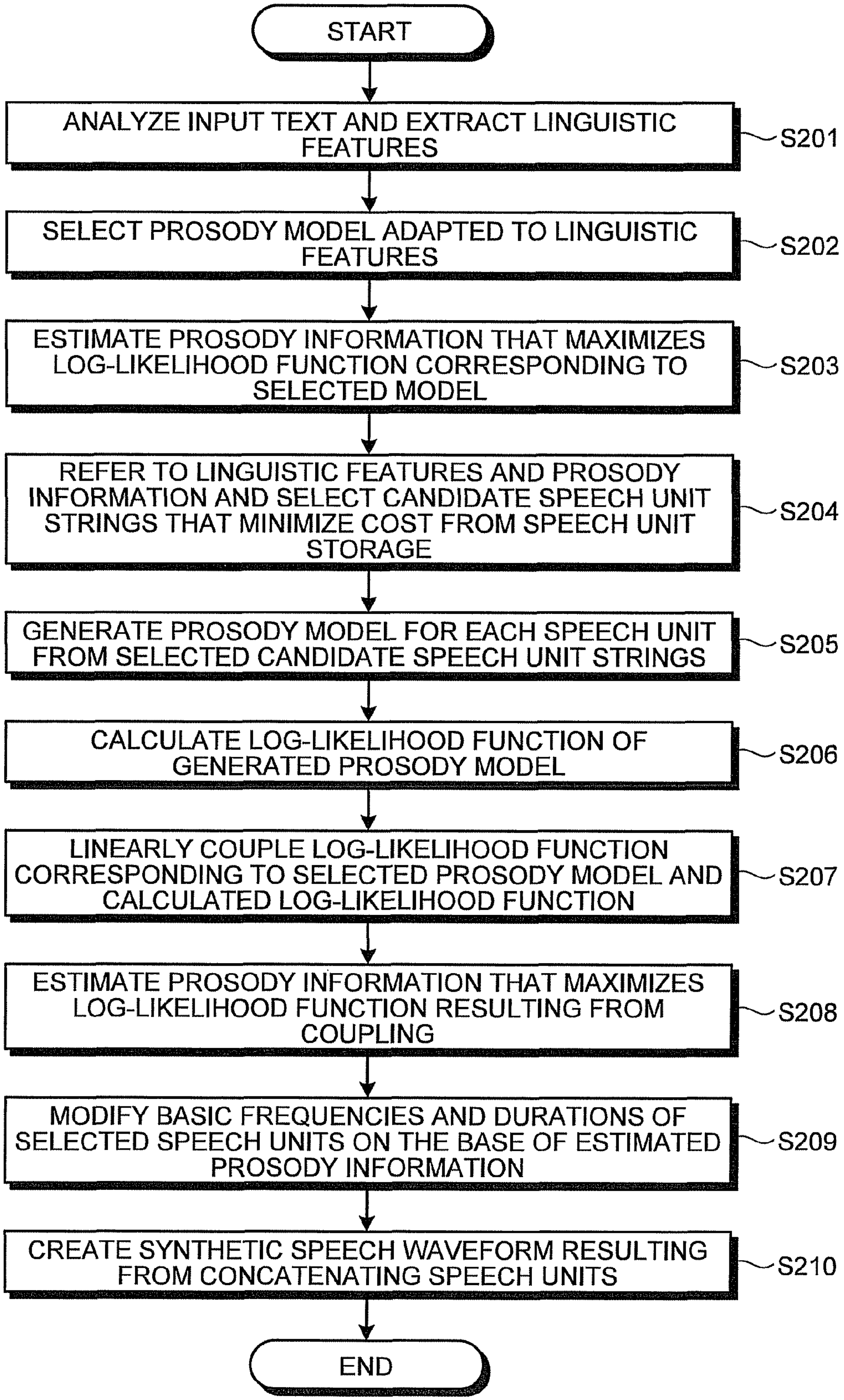
FIG. 2 is a flowchart illustrating the overall flow of a speech synthesis process according to the embodiment.

Next, a speech synthesis process performed by the speech synthesizer 100 configured as described above according to the embodiment will be described referring to FIG. 2. FIG. 2 is a flowchart illustrating the overall flow of the speech synthesis process according to the embodiment.

First, the analyzer 101 analyzes an input text and extracts linguistic features (step S201). Next, the first estimator 102 selects a prosody model matching the extracted linguistic features by using a predetermined decision tree (step S202). The first estimator 102 then estimates the basic frequency and the duration that maximize a log-likelihood function ($F^{initial}$) corresponding to the selected prosody model (step S203).

Next, the selector 103 refers to the linguistic features extracted by the analyzer 101 and the basic frequency and the duration estimated by the first estimator 102, and selects a plurality of candidate speech unit strings that minimizes the cost function from the speech unit storage 122 (step S204).

Next, the generator 104 generates a prosody model of a speech unit for each speech unit from the candidate speech unit strings selected by the selector 103 (step S205). Next, the second estimator 105 calculates a log-likelihood function ($F^{feedback}$) of the generated prosody model (step S206). The second estimator 105 further calculates, by using the equation (1) or the like, a total log-likelihood function $F^{total}$ that is a linear coupling of the log-likelihood function $F^{initial}$ corresponding to the prosody model selected in step S202 and the calculated log-likelihood function $F^{feedback}$ (step S207). The second estimator 105 then re-estimates the basic frequency and the duration that maximize the total log-likelihood function $F^{total}$ (step S208).

Next, the synthesizer 106 modifies the basic frequencies and the durations of the speech units selected by the selector 103 on the basis of the estimated basic frequency and duration (step S209). The synthesizer 106 then concatenates the speech units resulting from modification of the basic frequencies and the durations to create a waveform of synthetic speech (step S210).

As described above, the speech synthesizer 100 according to the embodiment generates a prosody model of speech units from a plurality of speech units selected on the basis of prosody information initially estimated by using prosody models stored in advance, and the speech synthesizer 100 according to the embodiment re-estimates prosody information that maximizes a likelihood obtained by linearly coupling a likelihood of the generated prosody model and a likelihood of the initial estimation.

Accordingly, in the embodiment, it is possible to modify prosody information of speech units and synthesize a waveform by using the basic frequency and the duration that are approximate to prosody information of selected speech units. As a result, distortion due to modification of the prosody information of speech units can be minimized, and the speech quality can be improved without increasing the size of the speech unit storage 122. Moreover, the naturalness and the quality of synthetic speech can be improved by maintaining the naturalness of the estimated prosody to the maximum extent.

A modified example will be described below. In the embodiment described above, speech units are selected only once. Alternatively, the selector 103 may be configured to re-select speech units and create a synthetic waveform by using the basic frequency and the duration that are re-estimated instead of the initial estimates. Alternatively, this operation may be repeated a plurality of times. For example, the process may be repeated until the number of re-estimations and re-selections of speech units exceeds a predetermined threshold. Further improvement in the speech quality can be expected by repeating such feedback.

In addition, although a component part that estimates the prosody information is divided into the first estimator 102 and the second estimator 105 in the embodiment described above, one component having the functions of both the components may be provided.

Figure 3:
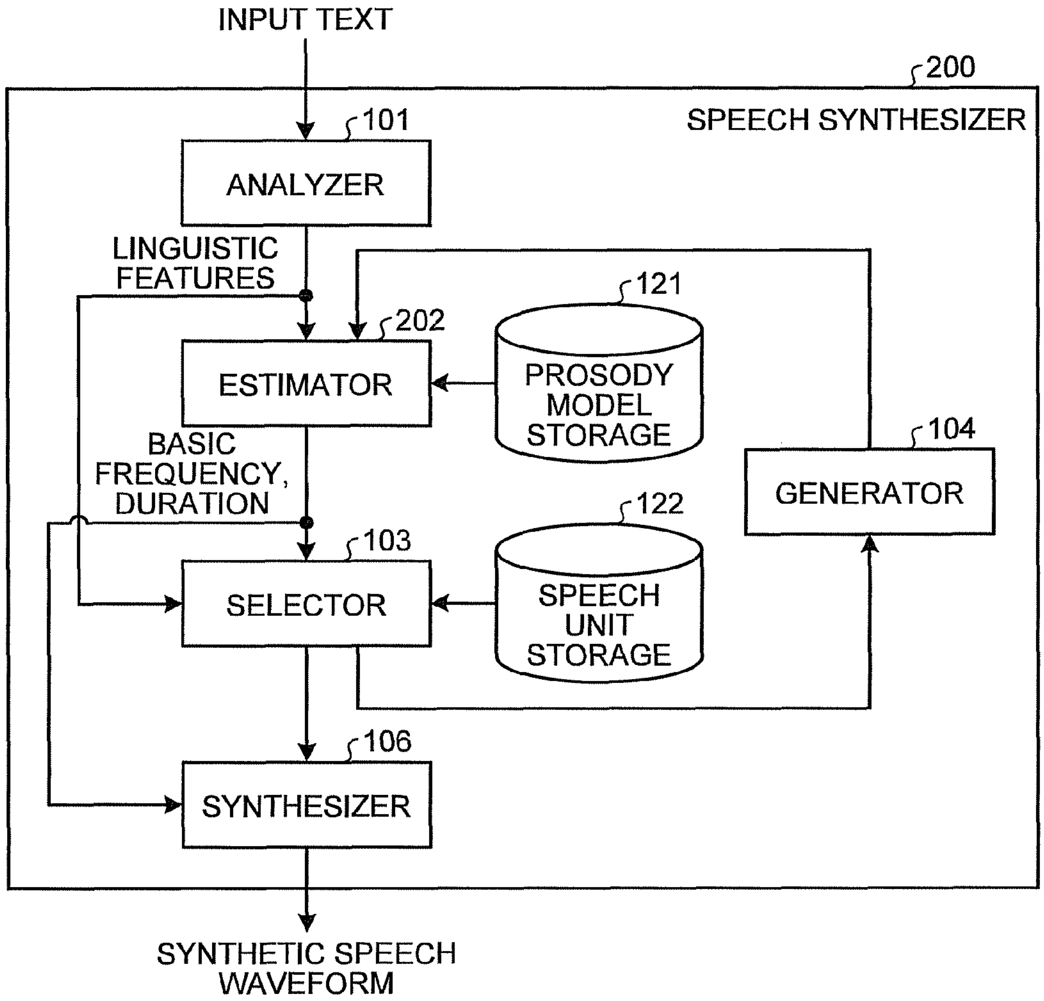
FIG. 3 is a block diagram illustrating an example of the configuration of a speech synthesizer according to a modified example.

FIG. 3 is a block diagram illustrating an example of a configuration of a speech synthesizer 200 according to a modified example of the embodiment that includes an estimator 202 as such a component. As illustrated in FIG. 3, the speech synthesizer 200 includes a prosody model storage 121, a speech unit storage 122, an analyzer 101, an estimator 202, a selector 103, a generator 104 and a synthesizer 106.

The estimator 202 has the functions of the first estimator 102 and the second estimator 105 described above. Specifically, the estimator 202 has the function of selecting a prosody model in the prosody model storage 121 that is adapted to linguistic features and initially estimating prosody information from the selected prosody model and has the function of re-estimating prosody information of each phoneme in an input text by using a prosody model of each speech unit generated by the generator 104.

Note that the overall flow of the speech synthesis process of the speech synthesizer 200 according to the modified example is similar to that in FIG. 2 described above, and the description thereof will thus not be repeated.

Figure 4:
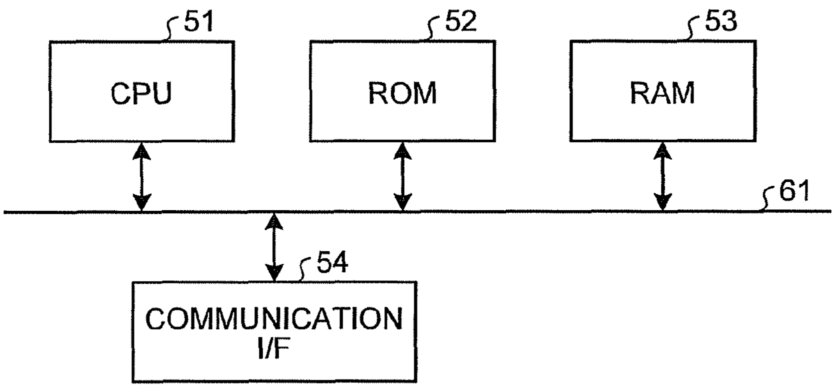
FIG. 4 is a hardware configuration diagram of the speech synthesizer according to the embodiment.

Next, a hardware configuration of the speech synthesizer according to the embodiment will be described referring to FIG. 4. FIG. 4 is a hardware configuration diagram of the speech synthesizer according to the embodiment.

The speech synthesizer according to the embodiment includes a control unit such as a CPU (central processing unit) 51, a storage unit such as a ROM (read only memory) 52 and a RAM (random access memory) 53, a communication I/F 54 for connection to a network and communication, and a bus 61 that connects the components.

Speech synthesis programs to be executed in the speech synthesizer according to the embodiment may be recorded on a computer readable recording medium such as CD-ROM (compact disk read only memory), a flexible disk (FD), a CD-R (compact disk recordable), and a DVD (digital versatile disk) in a form of a file that can be installed or executed, and provided therefrom.

Moreover, the speech synthesis programs to be executed in the speech synthesizer according to the embodiment may be stored on a computer system connected to a network such as the Internet and provided by being downloaded via the network. Alternatively, the speech synthesis programs to be executed in the speech synthesizer according to the embodiment may be provided or distributed through a network such as the Internet.

The speech synthesis programs executed in the speech synthesizer according to the embodiment can make a computer function as the respective components (analyzer, first estimator, selector, generator, second estimator, synthesizer, etc.) of the speech synthesizer described above. In the computer, the CPU 51 can read the speech synthesis programs from the computer readable recording medium onto a main storage device and execute the programs.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech synthesizer comprising:

a processor;

an analyzer that performs a text analysis of an input document and extracts a linguistic feature used for prosody control;

a first estimator that selects a first prosody model adapted to the extracted linguistic feature from predetermined first prosody models that are models of speech prosody information and that estimates prosody information that maximizes a first likelihood representing probability of the selected first prosody model;

a selector that selects, from a speech unit storage storing speech units, a plurality of candidates of a speech unit string that minimizes a cost function determined in accordance with the prosody information estimated by the first estimator;

a generator that generates a second prosody model that is a statistical model of prosody information of the speech unit included in the selected candidates, for each speech unit;

a second estimator that re-estimates prosody information that maximizes a third likelihood by differentiating the third likelihood with respect to a parameter of the second prosody model, the third likelihood being calculated by linearly coupling the first likelihood and a second likelihood representing probability of the second prosody model; and a synthesizer that generates synthetic speech by concatenating the speech units included in the selected candidates on the basis of the prosody information estimated by the second estimator, wherein the processor executes at least one of the analyzer, the first estimator, the selector, the generator, the second estimator, and the synthesizer.

2. The speech synthesizer according to claim 1, wherein the selector newly selects the candidates of the speech unit string that minimize the cost function determined in accordance with the prosody information estimated by the second estimator, and the synthesizer generates synthetic speech by concatenating the speech units included in the newly selected candidates on the basis of the prosody information estimated by the second estimator.

3. The speech synthesizer according to claim 2, wherein the generator further generates the second prosody model of the speech units included in the newly selected candidates, the second estimator further estimates prosody information that maximizes the third likelihood calculated by linearly coupling the second likelihood of the second prosody model generated from the speech units included in the newly selected candidates and the first likelihood, and the synthesizer generates synthetic speech by concatenating the speech units included in the selected candidates on the basis of the prosody information estimated by the second estimator when the number of estimations of prosody information performed by the second estimator exceeds a predetermined threshold.

4. A speech synthesis method comprising:

performing a text analysis of an input document and extracting a linguistic feature used for prosody control;

selecting a first prosody model adapted to the extracted linguistic feature from predetermined first prosody models that are models of speech prosody information, and first estimating in which prosody information that maximizes a first likelihood representing probability of the selected first prosody model is estimated;

selecting, from a speech unit storage storing speech units, a plurality of candidates of a speech unit string that minimizes a cost function determined in accordance with the prosody information estimated in the first estimating;

generating a second prosody model that is a statistical model of prosody information of the speech unit included in the selected candidates, for each speech unit;

second estimating in which prosody information that maximizes a third likelihood by differentiating the third likelihood with respect to a parameter of the second prosody model, the third likelihood being calculated by linearly coupling the first likelihood and a second likelihood representing probability of the second prosody model is estimated; and generating synthetic speech by concatenating the speech units included in the selected candidates on the basis of the prosody information estimated in the second estimating.

5. Non-transitory computer readable medium including programmed instructions, wherein the instructions, when executed by a computer, causes the computer to perform:

performing an text analysis of an input document and extracting a linguistic feature used for prosody control;

selecting a first prosody model adapted to the extracted linguistic feature from predetermined first prosody models that are models of speech prosody information, and first estimating in which prosody information that maximizes a first likelihood representing probability of the selected first prosody model is estimated;

selecting, from a speech unit storage storing speech units, a plurality of candidates of a speech unit string that minimizes a cost function determined in accordance with the prosody information estimated in the first estimating;

generating a second prosody model that is a statistical model of prosody information of the speech unit included in the selected candidates, for each speech unit;

second estimating in which prosody information that maximizes a third likelihood by differentiating the third likelihood with respect to a parameter of the second prosody model, the third likelihood being calculated by linearly coupling the first likelihood and a second likelihood representing probability of the second prosody model is estimated;

and generating synthetic speech by concatenating the speech units included in the selected candidates on the basis of the prosody information estimated in the second estimating.

* * * * *